US009971359B2

(12) United States Patent
Haller et al.

(10) Patent No.: US 9,971,359 B2
(45) **Date of Patent: *May 15, 2018**

(54) CONTROLLED THREE-WAY PROPORTIONAL VALVE UNIT

(71) Applicant: Hoerbiger Automatisierungstechnik Holding GmbH, Altenstadt (DE)

(72) Inventors: Daniel Haller, Landsberg am Lech (DE); Max Schrobenhauser, Peiting (DE); Jochen Schaible, Hunenberg (CH)

(73) Assignee: HOERBIGER AUTOMATISIERUNGSTECHNIK HOLDING GMBH, Altenstadt (DE)

( * ) Notice: Subject to any disclaimer, the term of this patent is extended or adjusted under 35 U.S.C. 154(b) by 396 days.

This patent is subject to a terminal disclaimer.

(21) Appl. No.: 14/640,204

(22) Filed: Mar. 6, 2015

(65) Prior Publication Data

US 2015/0177740 A1 Jun. 25, 2015

Related U.S. Application Data

(63) Continuation of application No. PCT/EP2013/002598, filed on Aug. 29, 2013.

(30) Foreign Application Priority Data

Sep. 7, 2012 (DE) ........................ 10 2012 017 714

(51) Int. Cl.
*F15B 13/042* (2006.01)
*G05D 7/06* (2006.01)
(Continued)

(52) U.S. Cl.
CPC .......... *G05D 7/0676* (2013.01); *F15B 11/006* (2013.01); *F15B 11/10* (2013.01);
(Continued)

(58) Field of Classification Search
CPC .... F15B 11/006; F15B 11/10; F15B 13/0405; F16K 11/10
See application file for complete search history.

(56) References Cited

U.S. PATENT DOCUMENTS 7,284,471 B2 * 10/2007 Jacobsen ................ F15B 13/04 91/433
7,308,848 B2 * 12/2007 Jacobsen ................ F15B 13/04 91/433
(Continued)

FOREIGN PATENT DOCUMENTS

DE 2654219 A1 6/1987
DE 102007058518 A1 6/2009
(Continued)

OTHER PUBLICATIONS

International Search Report dated Nov. 18, 2013 in corresponding International Application No. PCT/EP2013/002598.

*Primary Examiner* — Michael Leslie
(74) *Attorney, Agent, or Firm* — Myers Molin, LLC

(57) ABSTRACT

The invention relates to a controlled three-way proportional valve unit comprising: a valve assembly with two individual valves; an actuating device actuating valves of the valve assembly; and a control unit acting upon the actuating device and having a control signal input, the valves of the valve assembly being designed as poppet valves arranged on opposite sides and having counter-rotatable valve spindles. The valve spindles are prestressed relative each other in opposite directions by a prestressing element such that, when the actuating unit is inactive, a first poppet valve is open and the second poppet valve is closed. The actuating device comprises an actuator common to both poppet valves, acts upon the two valve spindles and changes the position of the valve spindles counter to the effect of the prestressing element.

10 Claims, 6 Drawing Sheets

(51) Int. Cl.

| | |
|---|---|
| ***F15B 11/00*** | (2006.01) |
| ***F15B 11/10*** | (2006.01) |
| ***F15B 13/04*** | (2006.01) |
| ***F15B 13/02*** | (2006.01) |
| ***F16K 11/10*** | (2006.01) |

(52) U.S. Cl.

CPC .......... *F15B 13/02* (2013.01); *F15B 13/0405* (2013.01); *F16K 11/10* (2013.01); *F15B 2013/0409* (2013.01); *F15B 2211/30575* (2013.01); *F15B 2211/31* (2013.01); *F15B 2211/322* (2013.01); *F15B 2211/327* (2013.01); *F15B 2211/329* (2013.01); *F15B 2211/565* (2013.01); *F15B 2211/7052* (2013.01); *F15B 2211/7656* (2013.01); *Y10T 137/87201* (2015.04)

(56) References Cited

U.S. PATENT DOCUMENTS

| | | | | |
|---|---|---|---|---|
| 8,061,261 | B2 * | 11/2011 | Jacobsen ............... | F15B 11/006<br>91/433 |
| 8,317,154 | B2 * | 11/2012 | Kleegrewe .............. | F04B 43/04<br>137/83 |
| 8,528,583 | B2 * | 9/2013 | Kolbenschlag ......... | F15B 5/003<br>137/596.18 |
| 9,372,487 | B2 * | 6/2016 | Haller ................... | F15B 11/006 |
| 2009/0146088 | A1 | 6/2009 | Kleegrewe | |

FOREIGN PATENT DOCUMENTS

| | | | |
|---|---|---|---|
| DE | 10 2009 023706 | A1 | 12/2010 |
| EP | 2133546 | A1 | 12/2009 |

* cited by examiner

µC

μC

CONTROLLED THREE-WAY PROPORTIONAL VALVE UNIT

CROSS REFERENCE TO RELATED APPLICATIONS

This application is a continuation under 35 U.S.C. § 120 of International Application PCT/EP2013/002598, filed Aug. 29, 2013, which claims priority to German Application 10 2012 017 714.3, filed Sep. 7, 2012, the contents of each of which are incorporated by reference herein.

FIELD OF THE INVENTION

The present invention relates to a regulated proportional three-way valve unit with a valve group comprising two single valves, an actuating device that actuates the single valves of the valve group and a regulating unit acting on the actuating device and having a control-signal input.

BACKGROUND

In fluid engineering, valve units are used to influence the fluid flow selectively. This is the case, for example, of influencing the pressurization of a fluidically activated drive element, which in turn can be used, for example, to actuate a shutoff organ. In this connection, multi-way valve units with three ports are used for various applications, wherein typically one port—depending on the switched position of the multi-way valve unit—is in fluidic communication with one and/or other of the two remaining ports or else can be shut off relative to the other two ports. It is not only slide valves with such a function that are known, especially such in which a single slide, which can be displaced within a valve housing containing the three ports and which—depending on its position—opens or shuts off the said fluid communication paths. To the contrary, three-way valve units are also known that have a valve group comprising two structurally independent single valves, wherein the two single valves of the valve group can be actuated by means of an actuating device and typically one of three ports is in fluidic communication both with a valve chamber of the one single valve and also with a valve chamber of the other single valve (see EP 2133546 A1). In a particular manner—other than that according to EP 2133546 A1—these two single, valves can be biased in such a way that the one single valve—without pressurization of an actuator associated therewith—assumes a closed position, while the other single valve—without pressurization of an actuator associated therewith—assumes an open position.

The object of the present invention is to provide a regulated proportional three-way valve unit having the features indicated in the introduction, characterized by a high degree of operating safety and reliability as well as by good regulation behavior in combination with a relatively simple design structure.

SUMMARY

This object is achieved according to the present invention by the regulated proportional three-way valve unit specified in detail in the claims. In functional combination and synergetic interaction with the further features definitive for the inventive proportional three-way valve unit, it is therefore characteristic for the latter among other aspects that the two single valves of the valve group—preferably mounted in a common housing—are constructed as two poppet valves disposed opposite one another with valve spindles that can move in opposite directions and are biased in opposite directions by means of a biasing unit. This actuating device has an actuator, which is common to both poppet valves and acts on both valve spindles, and which—depending on its pressurization with an input variable—changes the position of the valve spindles against the action of the biasing unit. Under the action of the biasing unit—which biases the two valve spindles in mutually opposite directions—a first of the poppet valves is opened and the second poppet valve is closed while the actuating unit is inactive. Furthermore, according to the invention, this actuating unit and the biasing unit are matched to one another in such a way that, during steady changes of the input variable fed to the actor of the actuating device from a first operating value to a second operating value in a manner offset relative to one another (i.e. in a sequential actuating sequence), the first poppet valve is closed progressively over its entire operating travel at first and only then is the second poppet valve opened progressively over its entire operating travel, so that—when the said input variable is changed correspondingly—closing of the first poppet valve on the one hand and opening of the second poppet valve on the other hand take place in two different ranges for the input variable fed to the actor of the actuating device. In this way it is ensured that each value of the input variable for the actor is associated uniquely with precisely one particular position of both single valves of the three-way valve unit. As a further consequence, uniquely precisely one operating point of the valve group can therefore be associated in turn with each setpoint fed to the regulating unit. The switched state of the valve group is determined uniquely and exactly by a (single) sensor, which detects the relative distance of the two valve spindles from one another. The signal supplied by the sensor, which accordingly can provide information about the position of both poppet valves and thus about the current operating point of the valve group, is fed back in a manner that is particularly attractive as regards regulating systems—as an actual value—to the regulating unit, whereby matching of the actual operating point of the valve group with the setpoint fed to the regulating unit can be achieved in simple and reliable form. In particular, interdependences are precluded by the use of a single sensor common to both poppet valves, and so particularly stable regulation behavior is achieved. From the structural viewpoint, it is then particularly favorable when the sensor is disposed on a control platen, which in turn is disposed between the two valve spindles.

Because of the proportional operation of the valve group, a particularly long useful life of the components—significantly longer than that of pulse-width-modulated activation of the fluidic load pressurized via the valve group—is achieved, and specifically not least because all valves experience predominantly a partial deflection during operation and only rarely are actuated over their entire range of movement. In addition, the inventive valve unit is characterized, in a manner different from that applicable for three-way valve units used for slide valves, by a valve group that is completely leak-free (or at any rate suffers negligible leakage), which is an outstanding advantage in particular from viewpoints of efficiency, because hereby true "shutoff" or "hold" of a connected load (see hereinafter) is possible without continuous admission of pressurized fluid.

The advantages achievable by application of the present invention are particularly pronounced when, in the case of the change of the input variable depicted in the foregoing for the actor between closing of the first poppet valve and opening of the second poppet valve, a range ("shutoff range") exists in which both poppet valves are closed. In other words: During a change of the input variable for the actor, opening of the second poppet valve preferably begins not more or less simultaneously, i.e. at the same value of the input variable, with complete closing of the first poppet valve. To the contrary, a more or less pronounced range within which both poppet valves are closed exists instead for the input variable. Particularly preferably, this shutoff range in question occupies between 10% and 30% of the range attainable on the whole by the input variable. This is of great advantage for stable operating behavior. This shutoff range can be used in particular to shut off or to hold a fluidic load (such as a pneumatic cylinder) being pressurized via an inventive valve group. Precisely this range within which the load is being shut off or held can be monitored via the sensor. Since disturbing influences related to operation are detected via the sensor and—by virtue of feedback of the measured value to the regulating unit—can be compensated by the regulating circuit, the hold or shutoff range need be executed with only small safety reserves, meaning that it can be relatively narrow. Consequently, correspondingly broader ranges are available for positioning of the two poppet valves, and so they can be constructed with relatively flat characteristic curves (at least in ranges), thus permitting particularly sensitive adjustment of the flow through the valve group. As a further consequence, leaks in the "hold" state can always be kept to a minimum regardless of the service conditions, since the hold state can always be guided to the optimum middle position via the regulating circuit. And, by virtue of the monitoring of the hold and shutoff range, expanded diagnosis options are created for early detection in particular of changes in the dynamics, the response behavior, any signs of wear or soiling o the valve seats and even impairments of the overall function.

In a preferred improvement of the present invention, a fluidic, especially a pneumatic actuating device is provided, which has two pressure-displacement transducers pressurized from a common control chamber, a first of which acts (indirectly as the case may be) on the valve spindle of the first poppet valve and a second acts (indirectly as the case may be) on the valve spindle of the second poppet valve. Similarly, it is of advantage in particular when the fluidic actuating unit can be fed from the same fluid supply (such as a compressed-air source), which also supplies the working fluid to be influenced by the valve group. The matching of the two pressure-displacement transducers to one another used in the context of the present invention in the sense of the depicted hierarchy or actuation sequence can then be achieved by suitable engineering design of the area ratios of the two pressure-displacement transducers, on which the control pressure prevailing in the control chamber acts, and also by matching the biasing forces acting on the two poppet valves both relative to one another and relative to the respective associated effective area of the pressure-displacement transducer in question. Thus the biasing device in particular can act on the two valve spindles with different biasing forces. An effect of interest for operating safety then exists in the fact that pressure fluctuations developing—for whatever reason—in the control chamber, because they act on the two pressure-displacement transducers, can be detected via the sensor, and so the signal supplied by the sensor can also provide information on the operating state of the fluid supply. Conversely, because the sensor signal is fed back to the regulating unit, fluctuations of the operating pressure can be corrected, and so the desired fluid flow through the valve group can be maintained reliably even during possible fluctuations of the operating pressure. Nevertheless, the pneumatic construction of the actuating device explained in the foregoing is in no case imperative; to the contrary, other types of constructions of the actuating device may be advantageously considered—under different prerequisites—in the context of the present invention, for example actuating devices of electromagnetic type based on the coil-armature principle.

According to another preferred improvement of the present invention, in the specific case of an actuating device of fluidic construction, the valve unit is constructed in two stages, i.e. the valve group explained in the foregoing is part of a two-stage valve unit, which further comprises an electrofluidic pilot stage, which is connected between the regulating unit and the valve group and which in turn comprises an electrical signal input connected with the regulating unit, a pressurized-fluid inlet, a control-pressure outlet in communication with the control chamber and a proportional pilot valve disposed between the pressurized-fluid inlet and the control-pressure outlet. Such a two-stage construction of the valve unit is particularly advantageous when—in the sense depicted in the foregoing—fluidic actuation of the two single valves via associated pressure-displacement transducers takes place from a common control chamber. In this regard it is also significant that, by virtue of the use of the working fluid switched by the valve group in the pilot stage also, i.e., for actuation of the two single valves, synergetic effects, which are manifested in particular in an equally compact and efficient system, can be achieved. In other words, the influence on the two pressure-displacement transducers in order to change the position of the valve spindles of the two poppet valves takes place selectively in this improvement via an electrical signal, via which the pilot stage is variably activated. The activation signal of the pilot stage is ideally generated via a regulating circuit, where the sensor signal is taken into consideration.

In the foregoing improvement of the present invention, the electrofluidic pilot stage can operate successfully with precisely one electromechanical transducer and precisely one proportional valve actuated thereby. In conjunction with the unique correlation, which is characteristic of inventive valve units, of the operating point, defined by the switched status of the two poppet valves, of the valve group with the pressure in the one (single) control chamber, a position regulator designed using the inventive valve unit, for example, can be easily kept under control by regulating systems despite little structural and apparatus-related complexity, and so instabilities in particular can be avoided.

According to yet another particularly preferred improvement, the units respectively comprising a poppet valve and the associated actor have a nonlinear variation of the characteristic curve of the opening cross section versus the input variable of the actor. Instead, the characteristic curve is preferably flat in the neighborhood of the respectively completely closed range of the poppet valve in question, in the sense that a given change of the opening cross section requires a larger change of the input variable than in a range further removed from the completely closed valve. In other words, for both poppet valves the gradient determining the ratio of the opening cross section to the input variable of the actor is flatter, particularly preferably when it is close to the respective closing point, than when it is further removed from the respective closing point. This permits, for example, particularly sensitive pressurization of a drive element of a positioning drive actuated via the inventive valve unit, in which case especially the fine-adjustment range bordering the hold range on both sides can be utilized particularly exactly by monitoring the positioning-regulator state, even at low required mass flows. This in turn is also a viewpoint of great advantage with regard to the stability of regulation. Corresponding matching of the components with regard to the said nonlinearity can therefore be applied not only to the respective actor (e.g. the pressure-displacement sensor). To the contrary, such matching is also possible at the poppet valve itself, specifically by constructing it with soft-sealing capability. To generate the said flat gradient of the characteristic curve, the sealing edges can be matched in such a way to the hardness of the respective valve seat that—by appropriate shaping—an opening gap is formed at first not over the entire circumference of the sealing edge but instead only over a partial extent of the sealing edge. It is particularly advantageous as regards the soft-sealing properties of the poppet valve explained in the foregoing when the valve seat is constructed on a captive seal, wherein the sealing edge is particularly preferably constructed on the movable valve member (closing member).

According to yet another preferred improvement, the sensor characteristic of the inventive three-way valve unit can constitute a functional component of the biasing device, by the fact that it is constructed as an integral spring-sensor element. By this it will be understood that the said element not only supplies a biasing force acting on at least one of the valve spindles, preferably on both valve spindles, but at the same time generates a signal—to be fed back to the regulating unit—that corresponds to the relative distance between the two valve spindles. In this way a further engineering and design simplification of the inventive three-way valve unit is possible, as is also a particularly compact construction thereof.

The inventive valve unit can be used with special benefits in the context of position regulators (for example, for valve positioning drives), wherein the drive element of the positioning drive then preferably has precisely one fluidic working chamber, which is in communication via a working outlet of the valve unit with respectively a first valve chamber of both poppet valves, wherein the second valve chamber of the first poppet valve is in communication with a pressurized-fluid supply and the second valve chamber of the second poppet valve is in communication with a pressurized-fluid vent. Such a design makes logical use of the options provided by the invention and makes available an efficient, compact, reliable positioning drive.

BRIEF DESCRIPTION OF THE DRAWINGS

The present invention will be explained in more detail hereinafter on the basis of the preferred exemplary embodiments illustrated in the drawing, wherein.

DETAILED DESCRIPTION OF THE PREFERRED EMBODIMENTS

Figure 1:
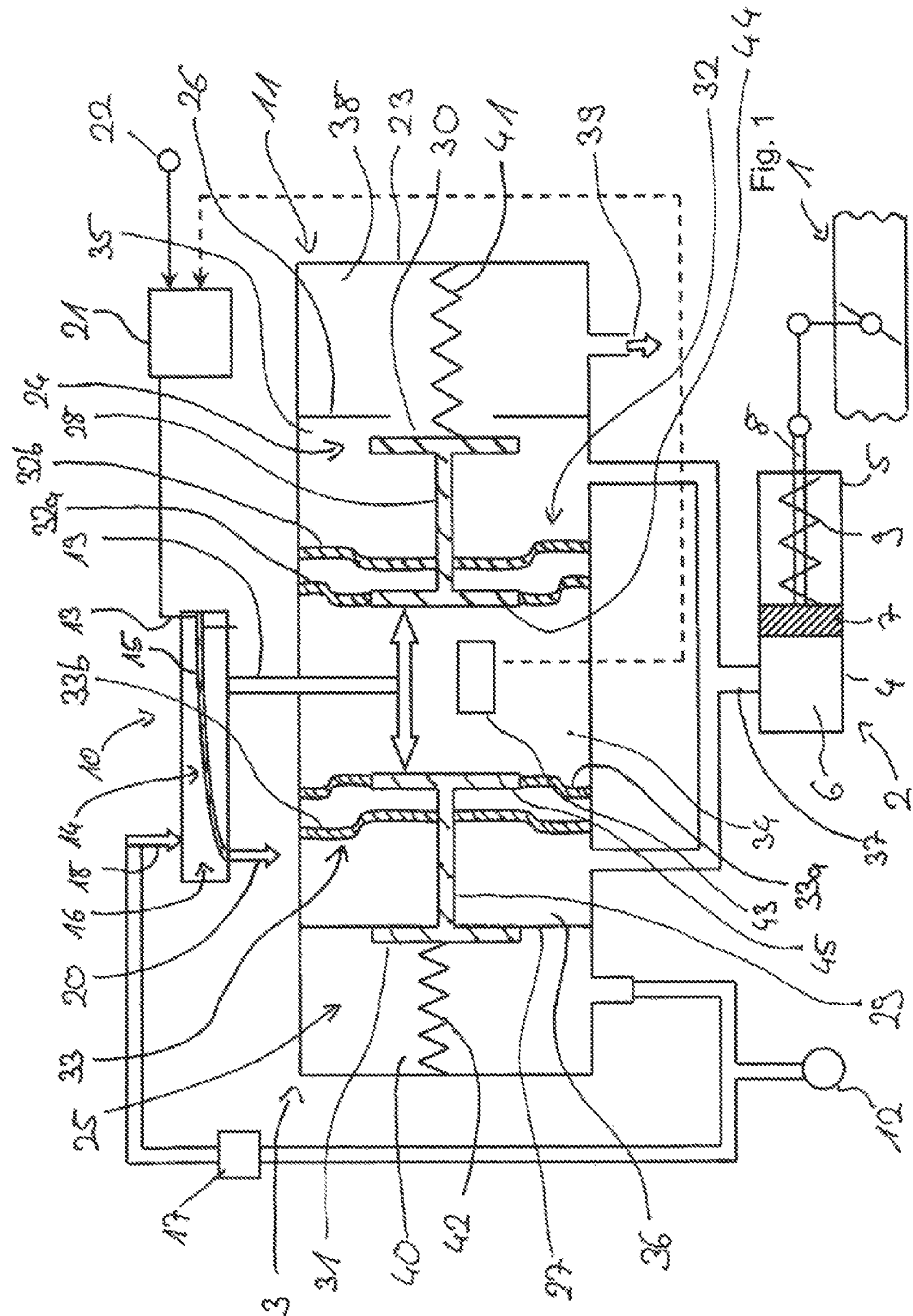
FIG. 1 shows a schematic diagram of a positioning drive, which is constructed using a first exemplary embodiment of an inventive valve unit.

The pneumatic positioning drive illustrated in FIG. 1 comprises, for actuation of a valve 1, a drive element 2 that can be pressurized with compressed air and a proportional position regulator 3 that regulates the pressurization of the drive element with compressed air. This drive element 2 is constructed in the form of a single-action pneumatic cylinder 4, which in a manner known in itself comprises a housing 5, a piston 7 plus piston rod 8 guided sealingly and displaceably therein and bounding a variable-volume working chamber 6, and a biasing or restoring spring 9 acting on piston 7.

Proportional positioning regulator 3 is constructed in two stages with an electropneumatic pilot stage (upstream stage) 10 and a pneumatic power stage 11. Both pilot stage 10 and power stage 11 are supplied by one and the same compressed-air supply 12.

Electropneumatic pilot stage 10 comprises an electrical signal input 13, precisely one electromechanical transducer 14 in the form of a piezoelectric bending transducer 15 and precisely one proportional valve 116 that can be actuated thereby having a compressed-air inlet 18 connected—via pressure-reducing valve 17—to compressed-air supply 12, a control-pressure outlet 19 and a vent outlet 20. In a manner known in itself, the pressure present at control-pressure outlet 19 depends on the specific geometry of piezoelectric bending transducer 15, which in turn depends on the voltage present at electrical signal input 13. Electrical input 13 in turn is connected via a regulating unit 21 with setpoint input 22.

Pneumatic power stage 11 comprises two poppet valves 24 and 25 mounted in the form of a valve group in housing 23 and disposed in diametrically opposite positions, each comprising a valve seat 26 and 27 respectively disposed in fixed relationship to the housing and a valve spindle 28 and 29 respectively with closing members 30 and 31 respectively disposed thereon. These valve spindles 28 and 29 respectively are joined sealingly and in fixed relationship with double-walled diaphragm units 32 and 33 respectively, while the space disposed within housing 23 between the two diaphragm units 32 and 33 forms a control chamber 34, to which control pressure outlet 19 of piezoelectric pilot stage 10 is connected. In detail, valve spindle 28 of poppet valve 24 is joined in fixed relationship to a pressure plate 44, which is a functional part of "control-pressure diaphragm" 32*a*, which in turn forms the wall of (double-walled) diaphragm unit 32 facing control chamber 34. The second wall of diaphragm unit 32 forms a "chamber diaphragm" 32*b*, wherein the space between control-pressure diaphragm 32*a* and chamber diaphragm 32*b* is unpressurized and supplied by air. An analogous situation exists for second poppet valve 25. Diaphragm units 32 and 33 seal control chamber 34 from a first valve chamber 35 or 36 respectively of poppet valve 24 or 25 respectively, wherein the two first valve chambers 35 and 36 respectively communicate with one another and with a common working outlet 37 of power stage 11, which in turn is in communication with pneumatic working chamber 6 of drive element 2. Second valve chamber 38 of first poppet valve 24 is then in communication with a compressed-air vent 39, while second valve chamber 40 of second poppet valve 25 is in communication with compressed-air supply 12. Pilot stage 10 can be integrated structurally in housing 23 of power stage 11 or can be built directly onto it, although this is not explicitly shown in the drawing.

Biasing or restoring springs 41 and 42 respectively act on both valve spindles 28 and 29 respectively, and specifically in such a way that, of the two poppet valves 24 and 25 of power stage 11—in the absence of pneumatic pressurization, i.e. when control chamber 34 is unpressurized (see hereinafter)—a first, namely first poppet valve 24 shown at the right in FIG. 1, is biased in an opened position, whereas the second, namely second poppet valve 25 shown at the left 1, is biased in a closed position. For each of the two poppet valves 24 and 25, the functional combination of diaphragm units 32 and 33 respectively and biasing or restoring springs 41 and 42 respectively form a pressure-displacement transducer—acting on the respective closing members 30 and 31 in question of the respective valve spindles 28 and 29 in question—in the sense that the position of the respective valve spindle 28 and 29 is guided by the pressure (control pressure) prevailing in control chamber 34. The diametrically opposite arrangement of the two poppet valves 24 and 25 already mentioned in the foregoing then also extends to the two pressure-displacement transducers, by means of which, in other words, poppet valves 24 and 25 can be actuated pneumatically. This is important to the extent that the two pressure-displacement transducers are pressurized from a common control chamber 34, which is in communication with control-pressure outlet 19 of pilot stage 10.

Figure 2:
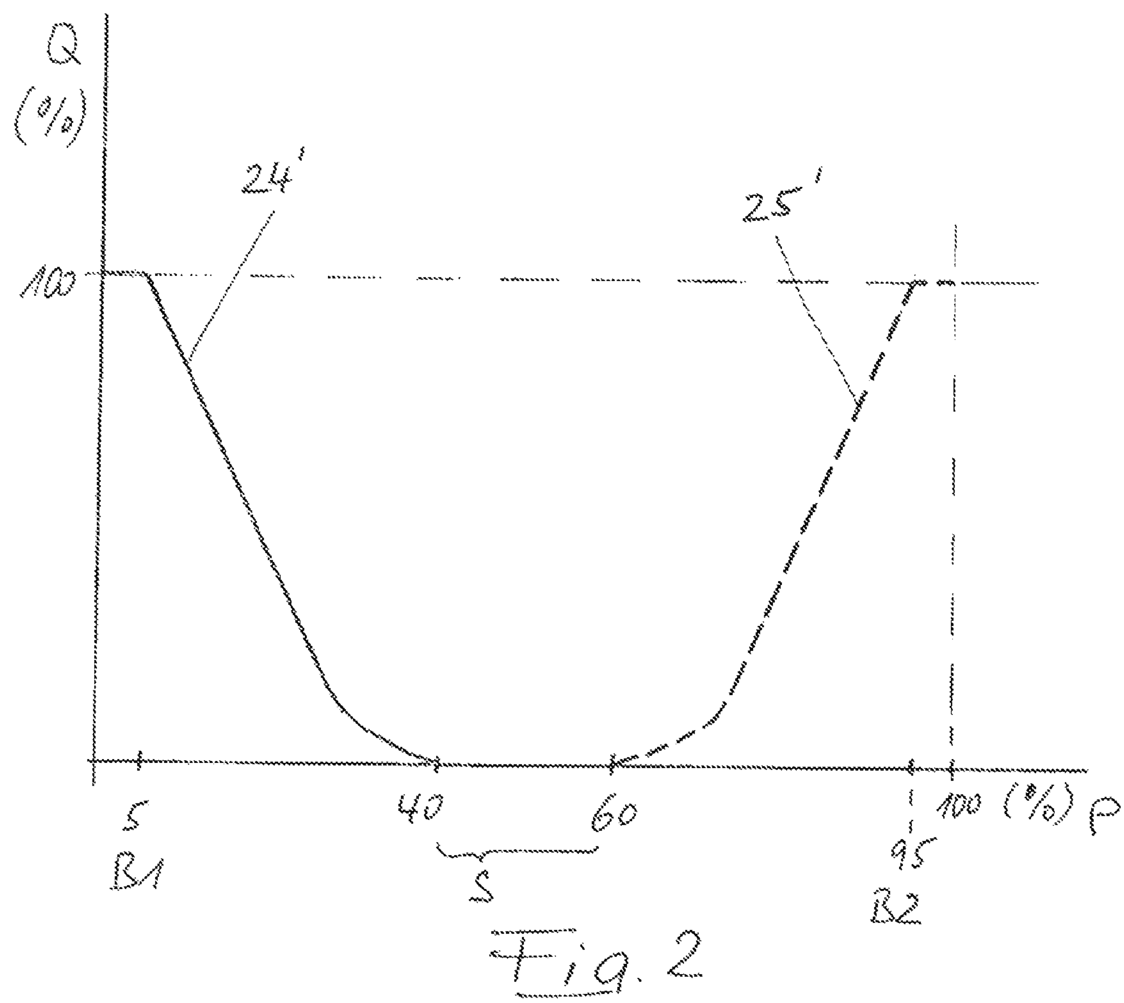
FIG. 2 shows a characteristic curve of the power stage of the valve unit according to FIG. 1, i.e. the opening cross sections of the two poppet valves versus the control pressure.

The pressure-displacement transducer associated with first poppet valve 24 is matched to the pressure-displacement transducer associated with second poppet valve 25 (see FIG. 2) in such a way that, during a steady pressure rise in control chamber 34, i.e. during steadily rising control pressure p via a limited—by a lower operating pressure B1 and an upper operating pressure B2—working pressure range, first poppet valve 24 is progressively closed at first and second poppet valve 25 is then progressively opened only after first poppet valve 24 has closed completely. Both poppet valves 24 and 25 are closed within a partial range—constituting a shutoff range S—of the working pressure range for the control pressure, wherein the shutoff range occupies approximately 20% of the control pressure range attainable in total by the control pressure. The mean value of the control-pressure range therefore lies within shutoff range S.

The working-pressure range makes up approximately 90% of the control-pressure range attainable in total by the control pressure, which means that the respective positions of the two poppet valves 24 and 25 do not change in the lowest 5% and in the highest 5% of the control-pressure range. As illustrated FIG. 2, the units respectively comprising a poppet valve 24 or 25 and the associated pressure-displacement transducer have a nonlinear shape of characteristic curve 24' or 25' of opening cross section Q versus control pressure p. In each case, a flat characteristic curve is present respectively close to or adjacent to shutoff range S, in the sense that a relatively large change—compared with the ranges of the performance characteristics further removed from shutoff range S—of control pressure p is necessary for a change of opening cross section Q of poppet valve 24 or 25 by a given extent. Such nonlinearities can be obtained in particular not only by suitable matching of valve seats 26 and 27 respectively and closing members 30 and 31 respectively to one another but also by adjustments on the part of the pressure-displacement transducers (e.g. of diaphragm units 32 and 33 respectively and/or of biasing and restoring springs 41 and 42 respectively).

The design explained in the foregoing leads to the following mode of operation of the positioning drive: If the control pressure prevailing in control chamber 34 is gradually raised—starting from an initially unpressurized state—by appropriate pressurization of electropneumatic pilot stage 10 by setpoint input 22 and via regulating unit 21, first poppet valve 24 begins to close after a pressure rise of approximately 5% (relative to the control-pressure range attainable in total by the control pressure), in which case the opening cross section of first poppet valve 24 changes relatively rapidly at first then much more slowly later, by virtue of the characteristic curve explained in the foregoing. At approximately 40% of the maximum control pressure, the first poppet valve is completely closed. As the control pressure continues to rise, the position of poppet valves 24 and 25 does not change until the control pressure reaches approximately 60% of the maximum value; at this point both poppet valves are shut off. It is only upon a further rise of the control pressure that second poppet valve 25 is opened, which actually happens gradually at first and then later more rapidly, specifically until it has reached its completely open position at approximately 95% of the maximum pressure.

By virtue of this characteristic of position regulator 3 and of the interfacing of compressed-air supply 12 and drive element 2 therewith as described in the foregoing, working chamber 6 of drive element 2 is shut off at a control pressure within shutoff range S (40% to 60% of the control pressure), is in communication with compressed-air vent 39 within the pressure range located between 0% and 40% (for different opening cross sections of first poppet valve 24) and is in communication with compressed-air supply 12 within the pressure range located between 60% and 100% (for different opening cross sections of second poppet valve 25). Accordingly, depending on the control pressure prevailing in control chamber 34, valve 1 is held (in the absence of internal air consumption of power stage 11), is closed more or less dynamically or else is opened—again more or less dynamically.

The position regulator comprises a sensor 43, which is disposed in control chamber 34 between the two poppet valves 24 and 25 and which measures the relative distance between the two pressure plates 44 and 45 joined in fixed relationship to valve spindles 28 and 29 respectively of poppet valves 24 and 25 respectively, A signal corresponding to the distance in question—and therefore characteristic of the current operating point of power stage 11—is fed by sensor 43 as a feedback actual value to regulating unit 21. Instead of the distance between pressure plates 44 and 45, it would also be possible as an alternative for sensor 43 to measure the distance between other elements—between which it is disposed, possibly on a control platen—of the two pressure-displacement transducers that react to control pressure. In this respect, it must be ensured that the pressure-displacement transducers and/or valve spindles 28 and 29 associated with the two poppet valves 24 and 25 are not rigidly coupled with one another.

Pilot stage 10 is constructed in such a way that control space 34 is unpressurized in the absence of an electrical input signal imposed on it, and so first poppet valve 24 is open and second poppet valve 25 is closed. As a consequence of this, working chamber 6 of drive unit 2 is unpressurized and piston 7 of drive unit 2 occupies the position dictated by biasing and restoring spring 9. In this way, in the event of failure of regulating unit 21 (or of a comparable defect) on the side of pilot stage 10, the position of poppet valves 24 and 25 of power stage 11—and also the position of drive element 2—is identical to that in the case of failure of compressed-air supply 11 Thus the positioning drive has a definite and unambiguous fail-safe behavior.

Figure 3:
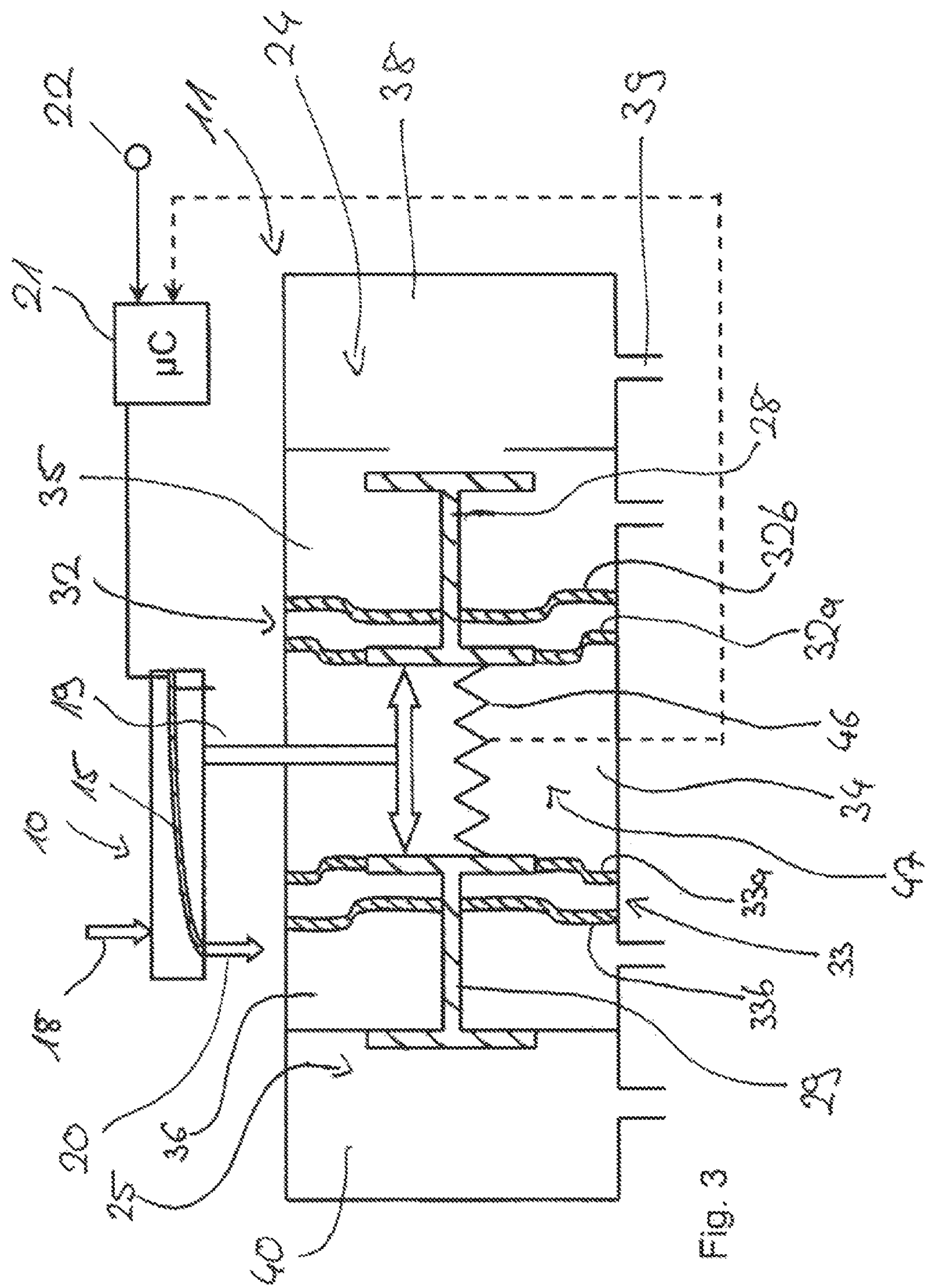
FIG. 3 shows a second exemplary embodiment of the invention as a modification of the exemplary embodiment according to FIG. 1.

The modification, illustrated in FIG. 3 (only in a corresponding section), of the positioning drive according to FIG. 1 differs from the embodiment explained in the foregoing primarily by a different type of configuration of the pressure-displacement transducer and of the sensor. And, in fact, the restoring forces acting on the two valve spindles 28 and 29 are supplied in this case by a common spring element 46, disposed in control chamber 34 and preloaded in tension. The hierarchy actuation according to the invention, whereby actuation of the two poppet valves 24 and 25 as a function of control pressure takes place in offset manner, is accordingly achieved by different design of the two diaphragm units 32 and 33 with respect to their area pressurized by the control pressure and/or to their stiffness. Above and beyond this, common spring element 46 then simultaneously represents a sensor 47, by the fact that a sensor function is integrated therein in order to measure the actual elongation of spring element 46 and to be fed back to regulating unit 21 as a variable characteristic of the operating point of the power stage, i.e. the position of the two poppet valves 24 and 25.

Figure 4:
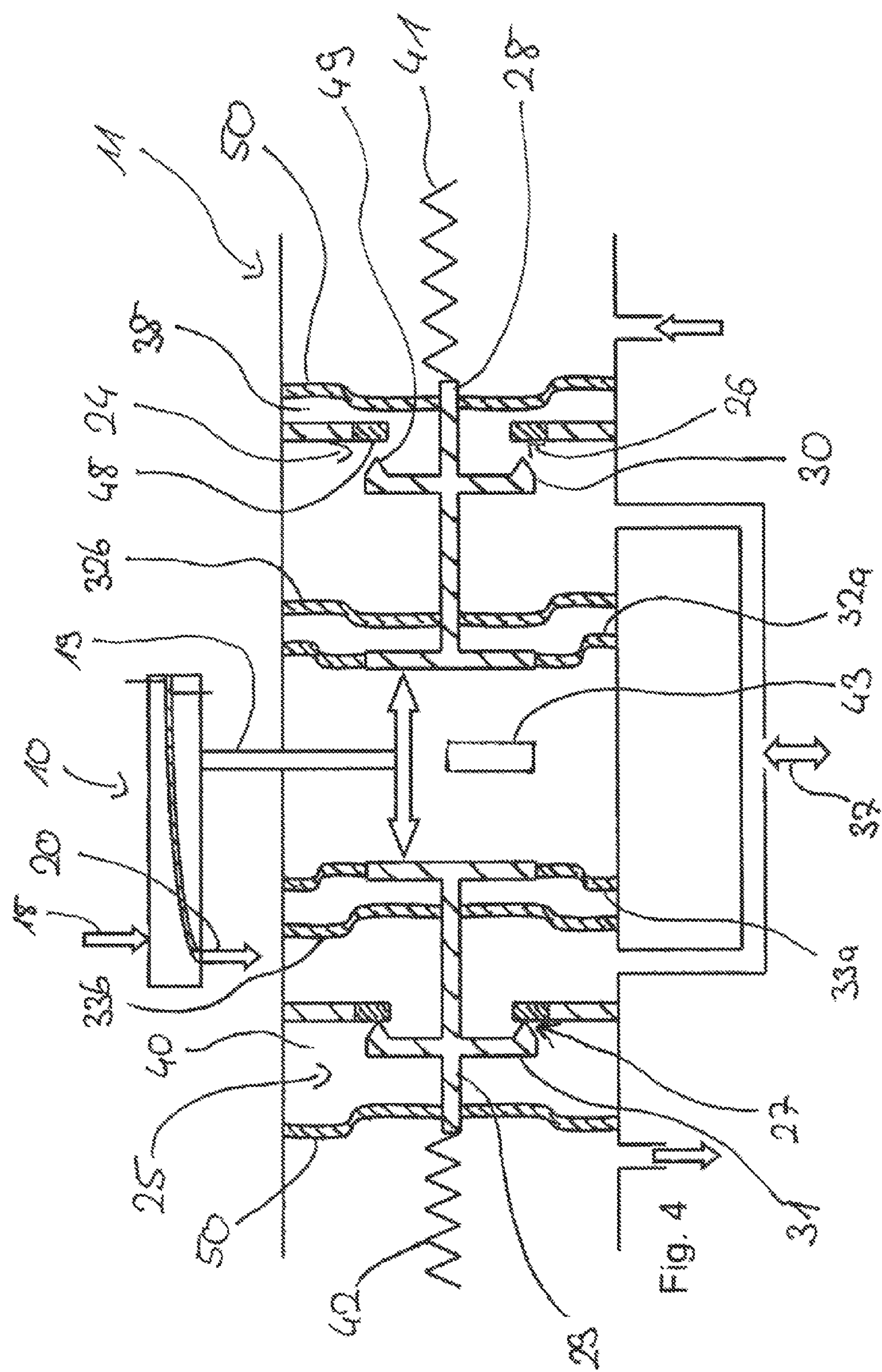
FIG. 4 shows a third exemplary embodiment of the invention as a modification of the exemplary embodiment according to FIG. 1.

FIG. 4 illustrates specific engineering options for configuration of poppet valves 24 and 25. In this case therefore, especially the use of soft-sealing poppet valves is illustrated, wherein valve seats 26 and 27 respectively are constructed on a captive seal 48 with a hardness between Shore 70 and Shore 85. And a well-defined sealing edge 49 is constructed on closing members 30 and 31 respectively of valve spindles 28 and 29 respectively. Hereby the nonlinearity of valve characteristic curves 24' and 25' already indicated in FIG. 2 (opening cross section Q vs. control pressure p) can be predetermined even more accurately, in order to permit the most sensitive positioning possible of drive element 2.

Furthermore, it is evident in FIG. 4 that a second diaphragm unit (chamber diaphragm) 50, which seals the respective second valve chamber 38 or 40 of the respective poppet valve from the environment, is joined to spindle 28 or 29 respectively of each poppet valve 24 or 25 respectively.

Figure 5:
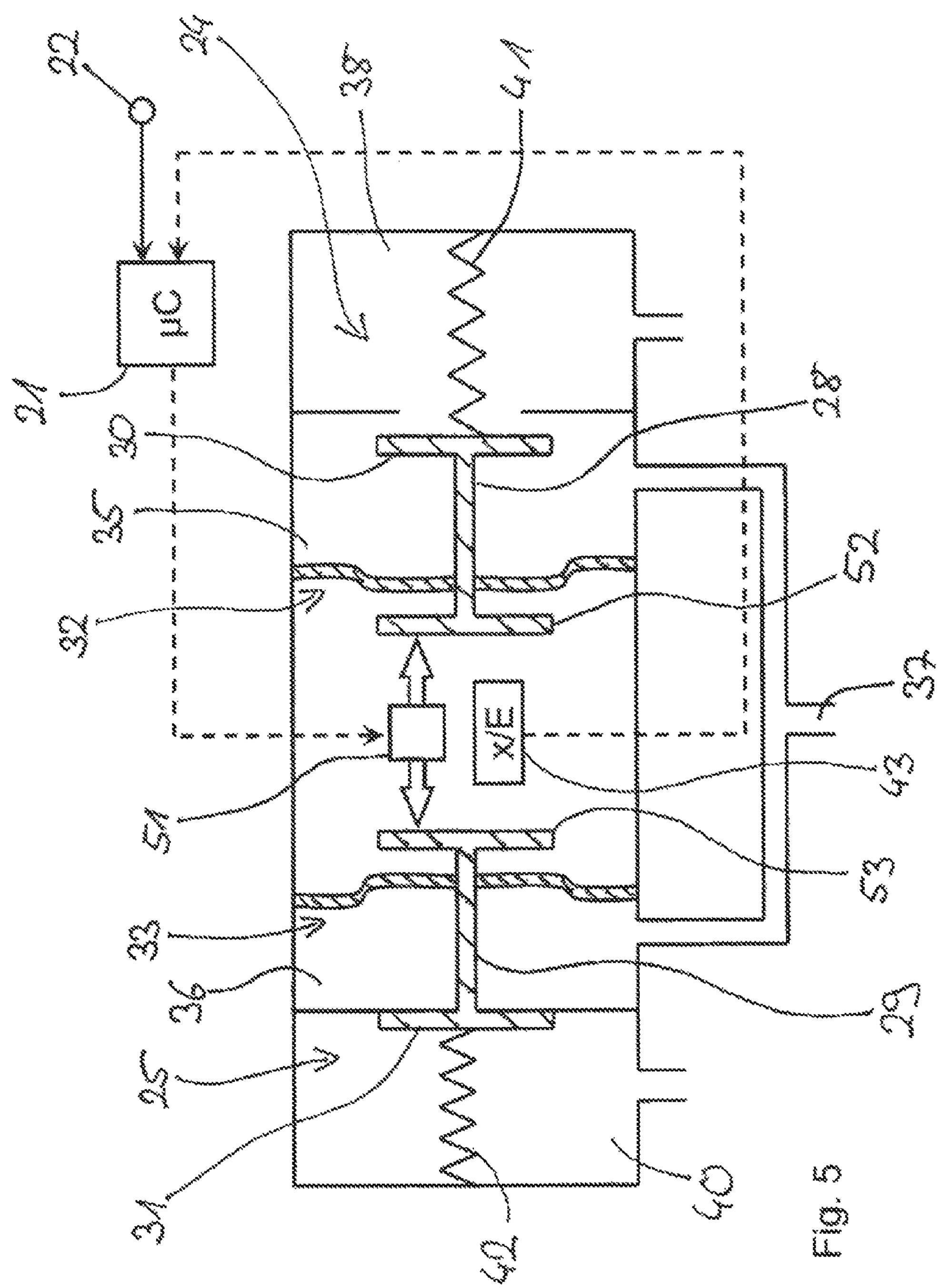
FIG. 5 shows a fourth exemplary embodiment of the invention as a modification of the exemplary embodiment according to FIGS. 1.

FIG. 5 illustrates an inventive valve unit in single-stage construction. Its structure and its function are evident directly from the foregoing explanation of the position regulator according to FIG. 1 and its mode of operation, albeit with the proviso that in this case the actuator pressurized by regulating unit 21 and acting on the two valve spindles 28 and 29 is based on any desired functional principle that is suitable, e.g. of electromagnetic type. Accordingly it can be constructed as a coil 51, which exerts, on plates 52 and 53 joined in fixed relationship to the ends of valve spindles 28 and 29, increasingly repulsive forces—corresponding to the actual pressurization thereof—in which case the hierarchical, sequential movement is imposed, initially on first poppet valve 24 and only thereafter on second poppet valve 25 by appropriate matching of biasing and restoring springs 41 and 42 and/or of diaphragm units 32 and 33, which in this case can have thin-walled construction. As a kinematic converse, it would obviously also be possible, by appropriate rearrangement of the poppet valves, to use a coil-armature configuration, in which valve spindles 28 and 29 are increasingly attracted by coil 51 in a manner corresponding to the pressurization thereof.

Figure 6:
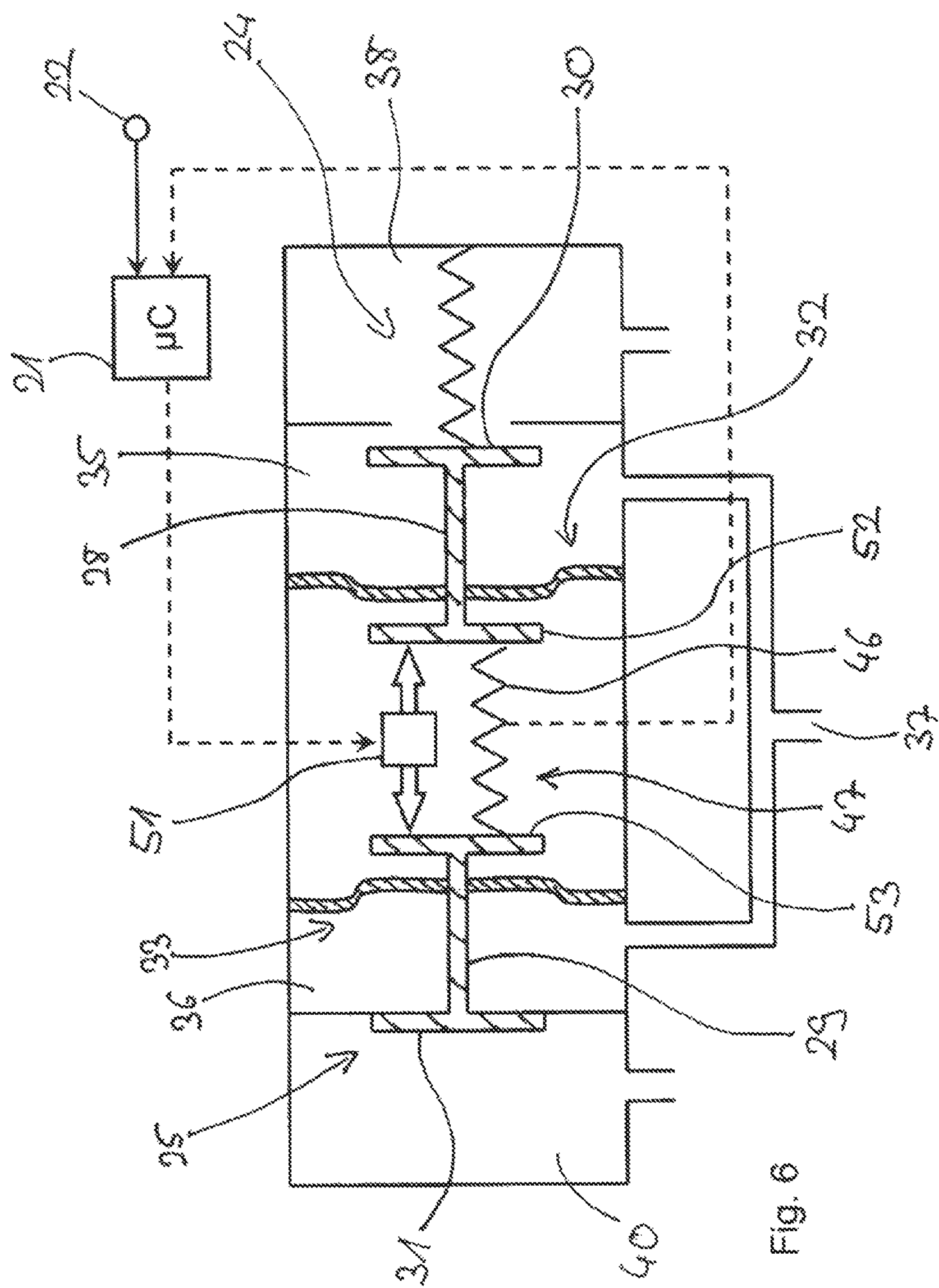
FIG. 6 shows a fifth exemplary embodiment of the invention as a modification of the exemplary embodiment according to FIG. 1.

The foregoing explanations about FIG. 5 apply correspondingly for the embodiment schematically illustrated in FIG. 6, except in this case a combined spring-sensor unit 47 is used, by analogy with the embodiment according to FIG. 3.

What is claimed is:

1. A regulated proportional three-way valve unit with a valve group comprising:

two single valves;

an actuating device that actuates the single valves of the valve group; and a regulating unit (21) acting on the actuating device and having a control-signal input, wherein;

the single valves of the valve group are constructed as two poppet valves (24, 25) disposed opposite one another with valve spindles (28, 29) that can move in opposite directions;

the two valve spindles (28, 29) are biased in mutually opposite directions by means of a biasing device, specifically in such a way that a first (24) of the poppet valves is opened and the second poppet valve (25) is closed while the actuating device is inactive;

a valve chamber (35) of the first poppet valve (24) and a valve chamber (36) of the second poppet valve (25) are in communication together with a first port (37) of the three ports of the valve unit;

the actuating device has an actuator, which is common to both poppet valves (24, 25) and acts on both valve spindles (28, 29), and which, depending on its pressurization, changes the position of the valve spindles against the action of the biasing device;

the actuating device and the biasing device are matched to one another in such a way that, during steady changes of the input variable fed to the actuating device from a first operating value to a second operating value in a manner offset relative to one another, the first poppet valve (24) is closed progressively over its entire operating travel at first and only then is the second poppet valve (25) opened progressively over its entire operating travel; and a sensor (43, 47) supplies a signal, which corresponds to a relative distance of the two valve spindles (28, 29) from one another and is fed back to the regulating unit (21).

2. The valve unit of claim 1, wherein a fluidic actuating device is provided, which has two pressure-displacement transducers pressurized from a common control chamber (34), a first of which acts on the valve spindle (28) of the first poppet valve (24) and a second acts on the valve spindle (29) of the second poppet valve (25).

3. The valve unit of claim 2, wherein the valve unit is constructed in two stages and comprises the fluidic actuating device, which is connected between the regulating unit (21) and the valve group and wherein the fluidic actuating device is an electrofluidic pilot stage, which in turn comprises an electrical signal input (13) connected with the regulating unit (21), a pressurized-fluid inlet (18), a control-pressure outlet (19) in communication with the control-pressure chamber (34) and a proportional pilot valve (16) disposed between the pressurized-fluid inlet (18) and the control-pressure outlet (19).

4. The valve unit of claim 1, wherein the valve unit is constructed as a single stage and has an electrical actuating device, on which the regulating unit acts directly.

5. The valve unit of claim 1, wherein the sensor (43) is disposed on a control platen, which in turn is disposed between the two valve spindles (24, 25).

6. The valve unit of claim 1, wherein a nonlinear relationship exists between the input variable fed to the control-signal input of the regulating unit (21) and an opening cross section of the two poppet valves (24, 25).

7. The valve unit of claim 1, wherein the biasing device acts on the two valve spindles (28, 29) with different biasing forces.

8. The valve unit of claim 1, wherein the sensor (47) is a functional component of the biasing device, by the fact that it is constructed as an integral spring-sensor element.

9. A positioning drive comprising a drive element (2) to which a pressurized fluid can be admitted and a valve unit according to claim 1 for regulating the pressurization thereof, wherein a working chamber (6) of the drive element (2) is in communication with a first port (37) of the valve unit.

10. The valve unit of claim 2, wherein the fluidic actuating device is a pneumatic actuating device.

* * * * *